(12) United States Patent
Kutzinsky et al.

(10) Patent No.: US 9,765,915 B2
(45) Date of Patent: Sep. 19, 2017

(54) SEALING DEVICE (71) Applicant: FORD GLOBAL TECHNOLOGIES, LLC, Dearborn, MI (US)

(72) Inventors: Ralf Kutzinsky, Cologne (DE); Juergen Meier-Sponheuer, Herne (DE); Wilfried Baeumler, Bergisch Gladbach (DE); Ralf Michels, Leverkusen (DE); Oliver Naumann, Muendersbach (DE)

(73) Assignee: Ford Global Technologies, LLC, Dearborn, MI (US)

( * ) Notice: Subject to any disclaimer, the term of this patent is extended or adjusted under 35 U.S.C. 154(b) by 53 days.

(21) Appl. No.: 14/669,047

(22) Filed: Mar. 26, 2015

(65) Prior Publication Data

US 2015/0276116 A1 Oct. 1, 2015

(30) Foreign Application Priority Data

Mar. 26, 2014 (DE) .................. 10 2014 205 626

(51) Int. Cl.
*F16L 55/10* (2006.01)
*F16L 55/132* (2006.01)
(Continued)

(52) U.S. Cl.
CPC ............ *F16L 55/132* (2013.01); *F16J 13/02* (2013.01); *F16L 55/1125* (2013.01); *F16L 55/1141* (2013.01); *Y10T 29/49998* (2015.01)

(58) Field of Classification Search
CPC ....... B65D 39/12; B65D 41/28; F16L 55/132; F16L 55/1141
(Continued)

(56) References Cited

U.S. PATENT DOCUMENTS 3,444,898 A    5/1969   Caple
5,014,866 A *   5/1991   Moore .................. F16L 59/163
                                                138/89
(Continued)

FOREIGN PATENT DOCUMENTS

CH           263230 A     8/1949
CN         101986120      3/2011
(Continued)

OTHER PUBLICATIONS

English machine translation of 101986120CN.
(Continued)

*Primary Examiner* — Patrick F Brinson
(74) *Attorney, Agent, or Firm* — Damian Porcari; King & Schickli, PLLC (57) ABSTRACT

The invention relates to a sealing device for cylindrical or conical orifices, which is composed of an elongate sealing body made from elastically deformable material, the following components being provided for the deformation of the sealing body: a tension bolt extending through the middle, free passage region of the sealing body, a pressure sleeve seated at the inner end of the tension bolt, a brace which is arranged at the outer end of the tension bolt and through which the tension bolt engages, and an actuation element which acts upon the outer end, projecting through the brace, of the tension bolt and which, when a tensile force is exerted upon the tension bolt, enlarges the sealing body and at the same time its outer circumference.

14 Claims, 8 Drawing Sheets

(51) Int. Cl.
*F16J 13/02* (2006.01)
*F16L 55/11* (2006.01)

(58) Field of Classification Search
USPC .................. 138/89; 215/325, 358–361, 238; 292/257
See application file for complete search history.

(56) References Cited

U.S. PATENT DOCUMENTS

| | | | |
|---|---|---|---|
| 5,224,515 A * | 7/1993 | Foster | B65D 59/06 138/89 |
| 6,581,642 B1 * | 6/2003 | Ritchie | G01M 3/022 138/89 |
| 7,726,498 B2 * | 6/2010 | Anraku | B01L 3/50825 215/247 |

FOREIGN PATENT DOCUMENTS

| | | | | |
|---|---|---|---|---|
| DE | 861060 C1 | 12/1952 | | |
| DE | 202005000521 U1 | 3/2005 | | |
| EP | 0085874 A2 * | 8/1983 | ............. | B65D 39/12 |
| GB | 19943 A | 0/1894 | | |

OTHER PUBLICATIONS

English Machine Translation of CH263230A.
English Machine Translation of DE202005000521U1.
English Machine Translation of DE861060C1.

\* cited by examiner

SEALING DEVICE

TECHNICAL FIELD

The invention relates to a sealing device for cylindrical or conical orifices, which as composed of an elongate sealing body made of elastically deformable material, the following components being provided for the deformation of the sealing body: a tension bolt extending through the middle, free passage region of the sealing body, a pressure sleeve seated at the inner end of the tension bolt, a brace which is arranged at the outer end of the tension bolt and through which the tension bolt engages, and an actuation element which acts upon the outer end, projecting through the brace, of the tensioning bolt and which, when a tensile force is exerted upon the tension bolt, contracts the sealing body and at the same time enlarges its outer circumference.

BACKGROUND

Sealing devices of the type mentioned have been known for a long time as bottle stoppers, the sealing body, which is arranged between the pressure sleeve and the brace, having at cylindrical configuration on its outer circumference. In this case, an eccentric, which is provided with a handle lever, serves for exerting a tensile force upon the tension bolt. Bottle stoppers of this type, however, are unsuitable for industrial purposes where it is important to have accurate and reliable seals.

A corresponding sealing device which can also be employed for industrial purposes is already known from CN000101986120B. The sealing body is in this case of slightly conical form and is inserted into a component orifice which has a corresponding orifice for internal engagement. The sealing body is then compressed in the axial direction by means of a lever mechanism, its diameter being enlarged and a seal with respect to the circumferential margin of the orifice to be closed being achieved as a result. Such at sealing device can be used to only a limited extent for industrial purposes, since, for example in the testing of engines, because of the high proportion of automated processes, increasing use is made of test methods for quality control, such as, for example, leak tests, cold tests or helium tests, which require the sealing off or filling of supply lines or component orifices. In this case, sealing devices are often employed in which the sealing bodies used are made from a relatively soft elastomeric material with a Shore A hardness in the range of 60 to 75. The relatively soft sealing bodies, which are expanded radially by axial pressure forces, for example in order to seal off a bore, have only a short service life, since compression and expansion give rise, within a very short time, to cracks in the overall sealing material which renders the sealing device useless relatively quickly. The consequences of this aging process are, for example in engine manufacture, gradually increasing leak rates, as a result of which failures in the test machines and therefore a considerable production loss may occur.

SUMMARY

The object on which this invention is based, therefore, is to develop a sealing device of the type initially mentioned, in such a way as to bring about a careful deflection of the axially acting forces into a radially oriented force distribution, in order to achieve long service lives, along with low wear, while at the same time it is to be ensured that the sealing device can also be used as a reliable clamping element for the gripping of the component to be sealed off.

This object is achieved, according to the invention, in that the sealing body is over its length of concave form.

Owing to the concave form, the axially acting forces are carefully deflected into a radially oriented force distribution, two lips or pressure zones occurring between the sealing body and the bore of the component.

Furthermore, on account of the design according to the invention, it is possible, for the production of the sealing body, to use materials which have relatively high hardness. The scaling body is preferably composed of an elastomer with a Shore A hardness of above 75.

In order to achieve optimal radial expansion of the concavely formed sealing body, the narrowest point of the sealing body lies approximately in its middle region.

In an especially advantageous design, the two regions of the sealing body which are adjacent to the narrowest point are of essentially frustoconical form.

The apex angles of the two frustoconical regions adjacent to one another may be identical. In an especially effective design, however, the apex angle of the frustoconical region lying on the same side as the brace is larger than that of the frustoconical region arranged on the same side as the pressure sleeve. However, the principle functions even when the sealing and clamping element is rotated 180° about its vertical axis. This is relevant only if the component is conical or cylindrical.

In order to achieve a good fit of the sealing device according to the invention in a hollow cylinder to be sealed off, the diameter of the pressure sleeve can be adapted with slight undersize to the cross section of the cylindrical orifice to be sealed off. As a result, from the very outset, an optimal fit of the sealing device in the orifice to be sealed off is achieved, and a favorable deformation mechanism of the sealing body during the rolling process is thereby assisted.

That region of the sealing body which is adjacent to the pressure sleeve is designed such that it has a slightly smaller diameter than the pressure sleeve. The same also applies to that region of the sealing body which is adjacent to the brace and which likewise has that a slightly smaller diameter than the orifice to be sealed off. This measure ensures very good edge protection, with the result that wear at these highly sensitive zones is considerably reduced and therefore the service life of the device is increased.

To avoid unnecessary wearing edges, the two frustoconical regions of the sealing body may have cylindrical flats at their ends facing away from one another, as a result of which the edge protection action is improved even further.

Furthermore, the sealing body may have at its two ends ring-cylindrical portions of reduced diameter which engage into corresponding reception regions of the pressure sleeve and of the brace. An especially good fit of the sealing body is thereby achieved, and an optimal axial introduction of force is attained in the sealing body.

Moreover, in the expanded state of the sealing body, an air gap may be provided in each case between the outer end faces of the frustoconical regions and the outer bearing ends of the pressure sleeve and of the brace.

The actuation element which exerts as tensile force upon the tension bolt may have various design features. In a preferred exemplary embodiment, the actuation element is formed as an eccentric which is connected pivotably to the outer end of the tension bolt and which is equipped with a lever for pivoting the eccentric.

The sealing device according to the invention may be also be used just as well for the rapid and reliable gripping and releasing of components which are provided with bores for internal engagement.

In order to allow easy and quick introduction into the corresponding bore to be sealed off or to be gripped, a guide element may be attached to the pressure sleeve.

Owing to the capacity of the sealing device according to the invention for diversified use, the gripping and sealing operation may be combined with subsequent leak tests or filling operations, so that the work cycles in this field can be optimized even more intensively.

BRIEF DESCRIPTION OF THE DRAWING FIGURES

The invention is illustrated by way of example in the drawing and is described in detail below by means of the drawing in which.

DETAILED DESCRIPTION

Figure 1:
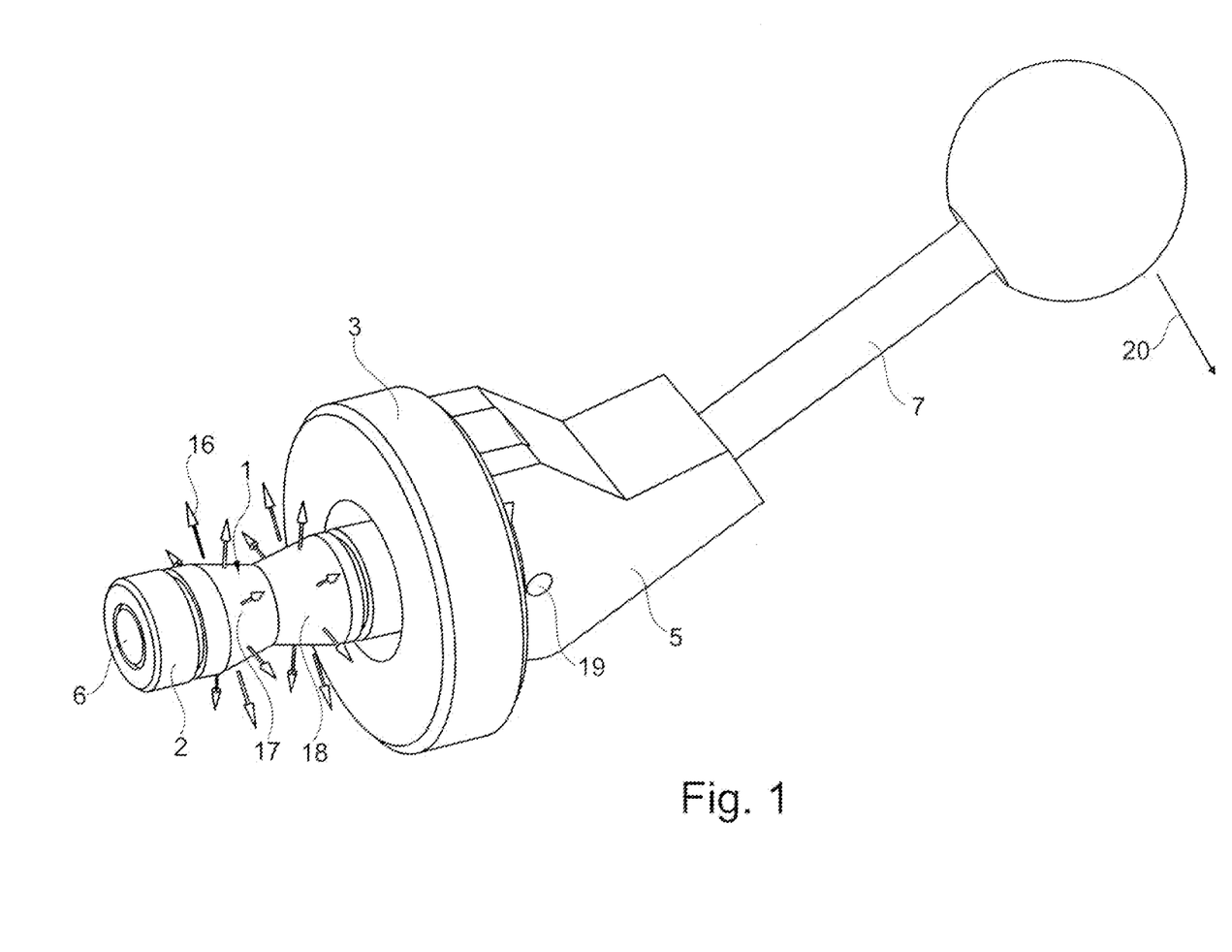
FIG. 1: shows, in a perspective illustration, an exemplary embodiment of the sealing device according to the invention which can also be used for gripping.

According to FIG. 1 of the drawing, the sealing device according to the invention, which is provided for the closure of cylindrical or conical orifices, is composed of an elongate sealing body 1 which over its length has concave geometry. This is due to two frustoconical regions 17 and 18, the smaller diameters of which are directed toward the middle of the sealing body 1. The point having the smallest material cross section of the sealing body 1 therefore occurs at their meeting point.

To perform a sealing function, the sealing body 1 is contracted in its longitudinal direction, so that its diameter widens as at result of rolling and bears sealingly against the cylindrical or conical wall to be sealed off.

For the deformation of the scaling body 1, the latter has a middle passage region, through which a tension bolt 6 extends. Arranged at the end to be introduced into an orifice to be sealed off is a pressure sleeve 2 which is seated firmly on the tension bolt 6 and against which the corresponding end of the sealing body 1 bears. At the other end of the tension bolt 6 is arranged a brace 3, through which the tension bolt 6 engages. At that end of the tension bolt 6 which engages through the brace 3, an actuation element is provided, which acts upon the tension bolt 6 and which, where a tensile force is exerted upon the tension bolt 6, contracts the sealing body 1 and consequently triggers the rolling behavior and the sealing operation associated with this.

Figure 2:
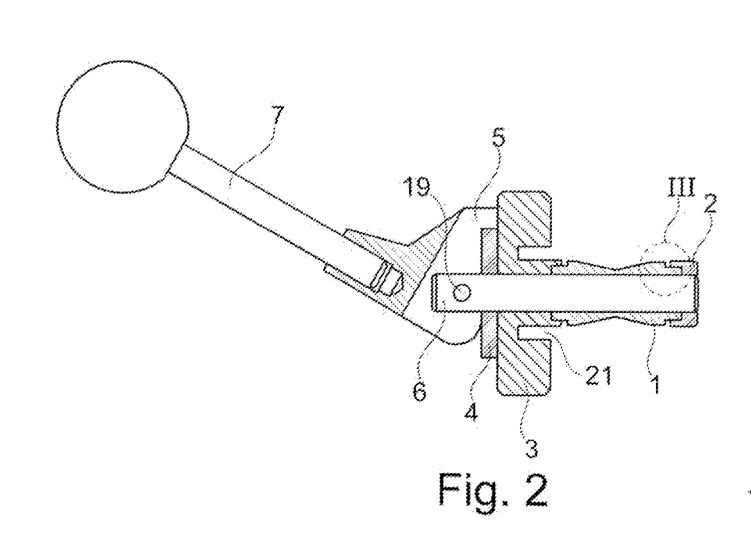
FIG. 2: shows, on a reduced scale, a section through the sealing device according to FIG. 1.

In the exemplary embodiment illustrated in FIG. 1 to 8, the actuation element provided is an eccentric 5 which is supported against the brace 3 or a pressure plate 4 illustrated in FIG. 2. The eccentric 5 is connected pivotably via a hinge pin 19 to the outer end of the tension bolt 6. To pivot the eccentric 5, the latter is equipped with a rigid lever 7 to be actuated by hand.

When the lever 7 is pivoted downward in the direction of the arrow 20 in FIG. 1, the tension bolt 6 is gradually pulled out of the brace 3, so that the sealing body 1 is deformed. In this case, peripheral force distribution occurs, as illustrated by the arrows 16 in FIG. 1.

In the cross section illustrated in FIG. 2, the eccentric 5 is shown in its inactive position in which the sealing body 1 is still completely undeformed. If the lever 7 is then pressed downward in the direction of the arrow 20 according to FIG. 2, the tension bolt 6 is gradually displaced to the left in the drawing and then occupies in steps the positions illustrated in FIGS. 4 to 8.

In FIGS. 4 to 8, the sealing device according to the invention is slipped onto a tubular workpiece 8 which is to be sealed off by means of the sealing device. The tubular workpiece 8 in this case engages into an annular gap 21 formed in the brace 3, so that a firm fit between the sealing device and the orifice, to be sealed off, of the workpiece 8 is thereby obtained.

As can be seen from FIGS. 4 to 8, the diameter of the pressure sleeve 2 is adapted in cross section to the orifice to be sealed off, specifically in such a way that said pressure sleeve engages with slight undersize into the orifice to be sealed off.

Figure 3:
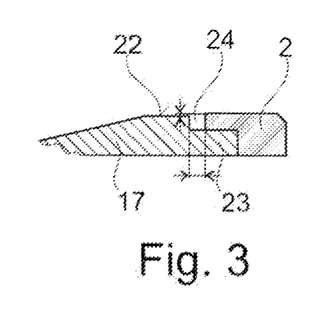
FIG. 3: shows, in an enlarged illustration, the region III from FIG. 2.
Figure 4:
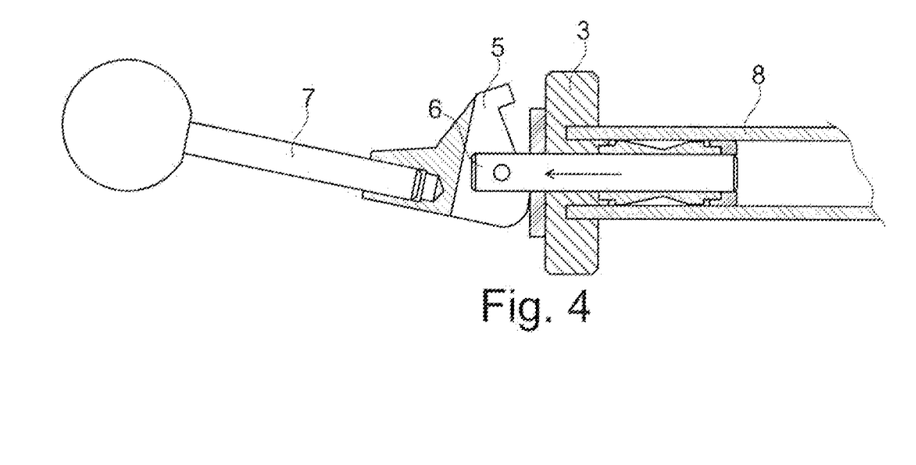
FIG. 4: shows the same section as FIG. 2, in which the sealing device is inserted into a tubular workpiece.
Figure 5:
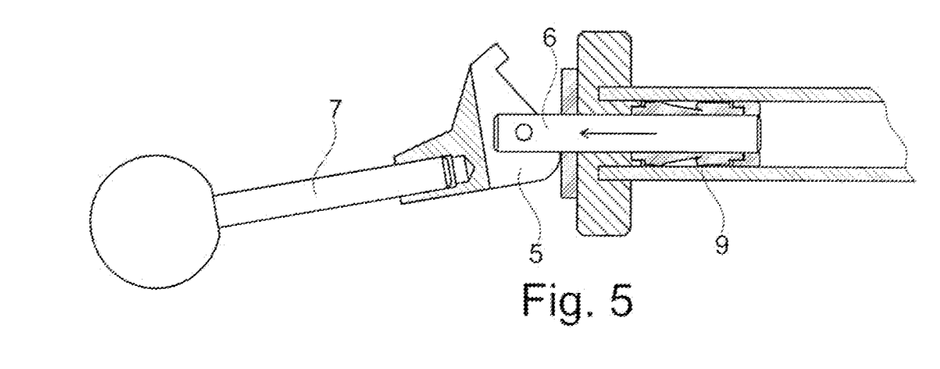
FIG. 5: shows the same section as FIG. 4, in which an axial force is already exerted upon the sealing body.
Figure 6:
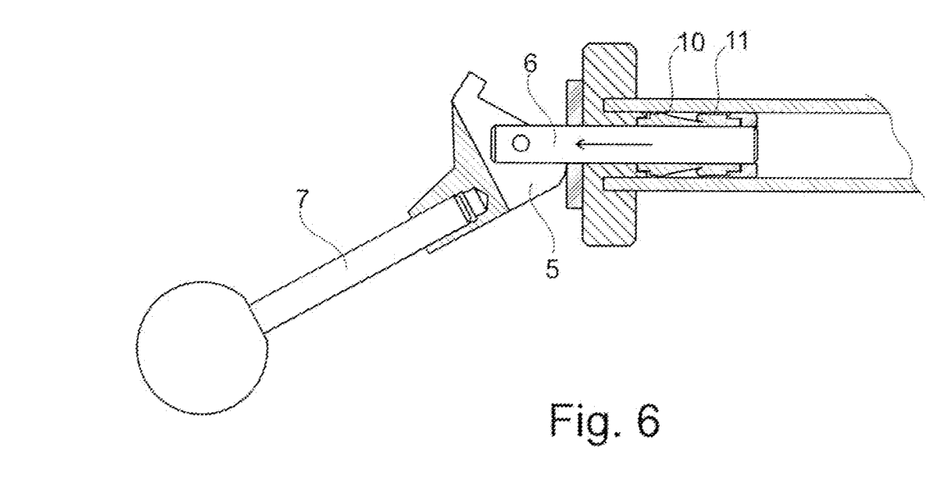
FIG. 6: shows the same section as FIGS. 4 and 5, in which the axial force is increased and the sealing body is deformed even further.
Figures 7, 8:
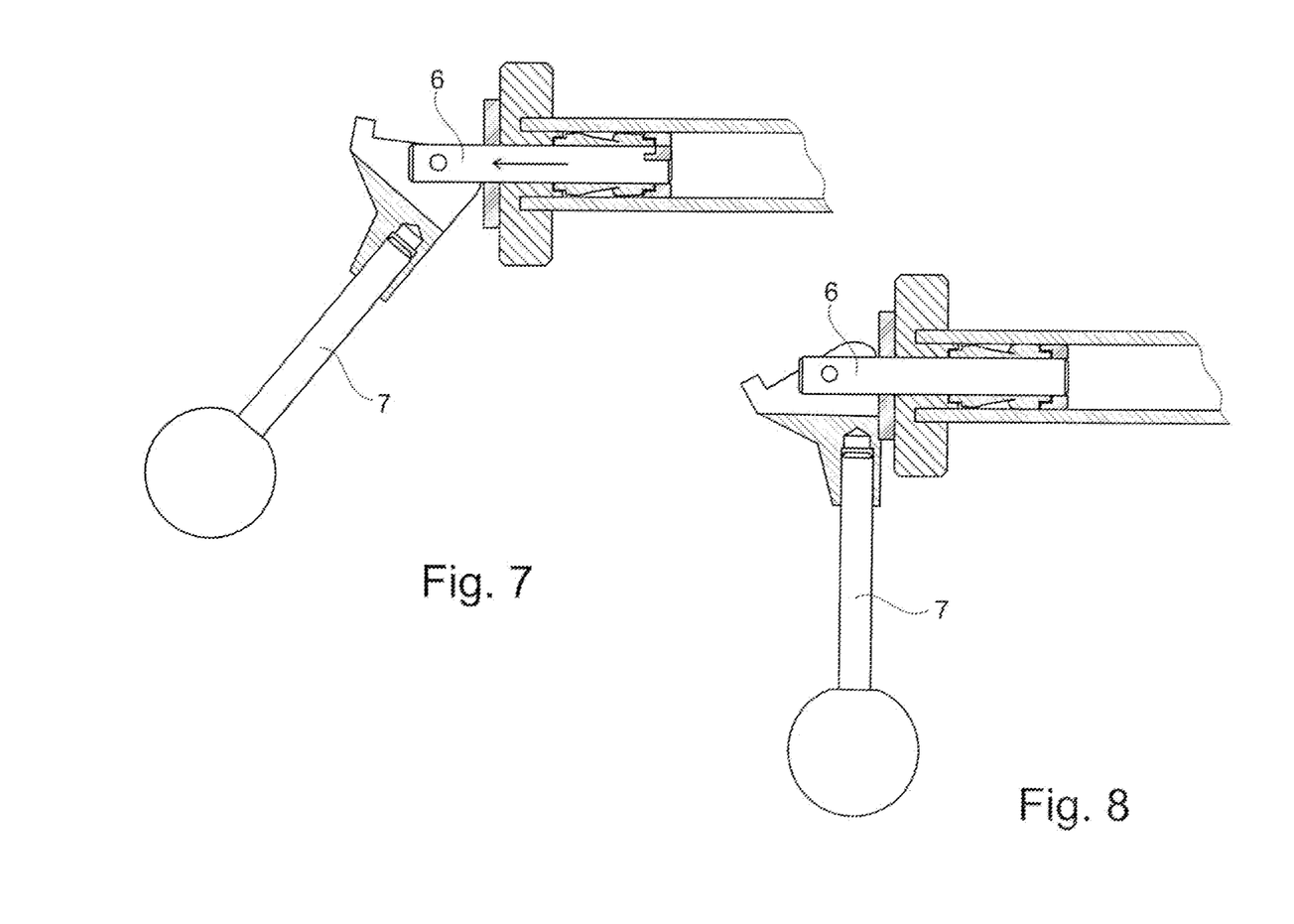
FIG. 7: shows the same section as FIG. 6 when an even higher axial force is being applied.
FIG. 8: shows the same section as FIG. 7, in which the maximum axial force is applied to the sealing body.

As can be seen particularly from FIG. 3, the two frustoconical regions 17 and 18 of the sealing body 1 have, at their ends facing away front one another, cylindrical flats 22 which have a slight undersize in relation to the outer circumference of the pressure sleeve 2. This measure serves for edge protection.

As may likewise be gathered from FIGS. 2 and 3, the sealing body has at its two ends ring-cylindrical portions 23 of reduced diameter which engage with a form fit into corresponding reception regions of the pressure sleeve 2 and of the brace 3.

In the expanded state of the scaling body 1, as illustrated in FIGS. 2 and 3, an air gap 24 is provided in each case between the outer end faces of the frustoconical regions 17 and 18 and the outer bearing ends of the pressure sleeve 2 and of the brace 3.

Although not emphasized especially in the drawing, the apex angle of the frustoconical region 18 lying on the same side as the brace 3 may be designed to be larger than that of the frustoconical region 17 arranged on the same side as the pressure sleeve 2. This variant is suitable particularly for the sealing off of conical workpiece orifices.

As may be gathered, furthermore, from FIGS. 4 to 8, by the eccentric 5 being reversed an axial movement of the tension bolt 6 is generated, with the result that the elastomeric sealing body 1 is contracted.

FIGS. 5 to 8 illustrate the gradual deformation of the sealing body 1 in various steps. As may be gathered from these figures, the contraction of the sealing body 1 gives rise at its thinnest point to a rolling zone 9 in which a first surface is pushed below a second surface. In this case, the second surface rolls on the first.

When the deformation process progresses further, a bead occurs in each case in front of and behind the rolling zone 9, so that two sealing lips are formed within the workpiece S to be sealed off, specifically a rear sealing lip 10 near the brace 3 and a front sealing lip 11 near the pressure sleeve 2.

With the two angular surfaces rolling one into the other, the axial forces are converted in a very careful way into radially acting forces. In this case, it can be seen, particularly in FIG. 1, that the radial forces are distributed to the two angular surfaces of the frustoconical regions 17 and 18. The elastomeric sealing body 1 is therefore not only compressed, but also brought into its sealing-off form by rolling and mutual under pushing.

As a result of the contraction of the sealing body 1, while at the same time the frustoconical regions roll and are pushed one onto the other, the axially applied forces are distributed optimally to two radially spreading-out sealing lips 10 and 11. By virtue of this deformation mechanism, it is also possible to employ elastomers with substantially higher Shore A hardness than has been customary hitherto. Furthermore, much higher pressure forces are possible with these harder elastomers.

The sealing device according to the invention, in addition to its task as a sealing element, may also be used for the rapid and reliable gripping and releasing of components which are provided with bores for internal engagement.

With a view to optimal pared-down production, the sealing device according to the invention can have very versatile uses, specifically, for example, with a gripping of components, at the same time with the possibility of carrying out a leak test or filling operation.

Figure 9:
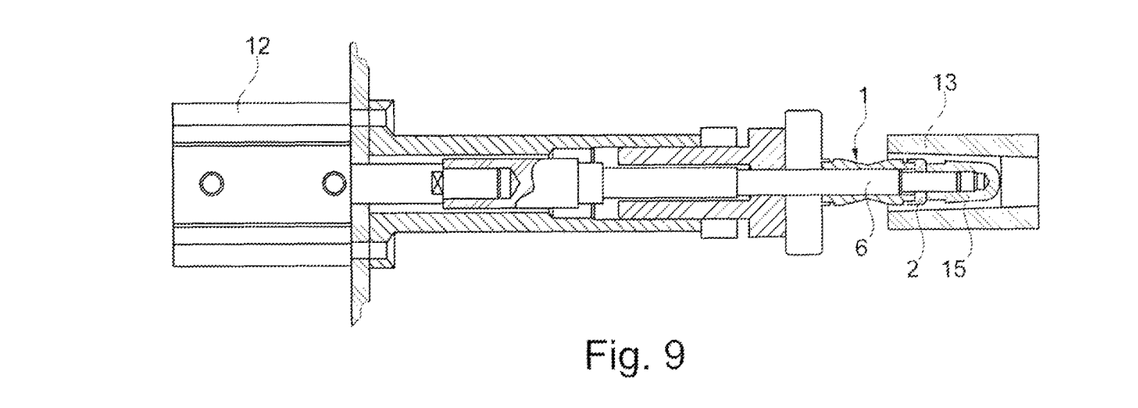
FIG. 9: shows a further exemplary embodiment of the sealing device according to the invention for sealing off or picking up a workpiece having a conical reception orifice.
Figure 10:
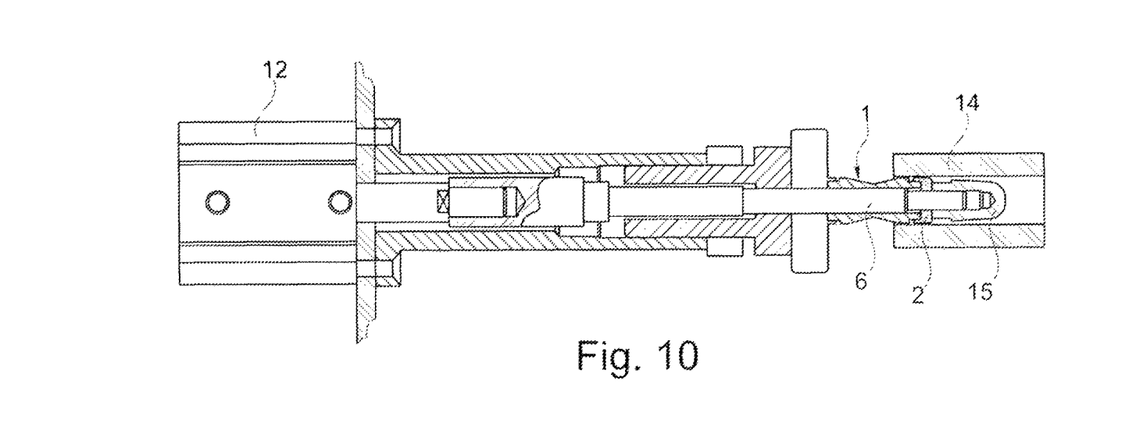
FIG. 10: shows the same section as FIG. 9 through the sealing device in relation to a workpiece having a cylindrical reception orifice.

What is suitable for this purpose is, for example, the embodiment, illustrated in FIGS. 9 and 10, of the device according to the invention, in which a pneumatic or hydraulic cylinder 12 is provided as the actuation mechanism of the tension bolt 6. This embodiment of the device according to the invention may be used both for a workpiece 13 with a conical bore and a workpiece 14 with a cylindrical bore.

In order to make it easier to grip a corresponding workpiece 13 or 14, the pressure sleeve 2 may have attached to it a guide element 15 which is formed slightly conically toward its front end, so that it can easily be slipped into the bore to be correspondingly gripped and sealed off.

Further examples of use are possible in automated production technology. The device according to the invention can be employed whenever parts have to be transported or filled or sealed off without any damage, reliably and efficiently.

Figure 11:
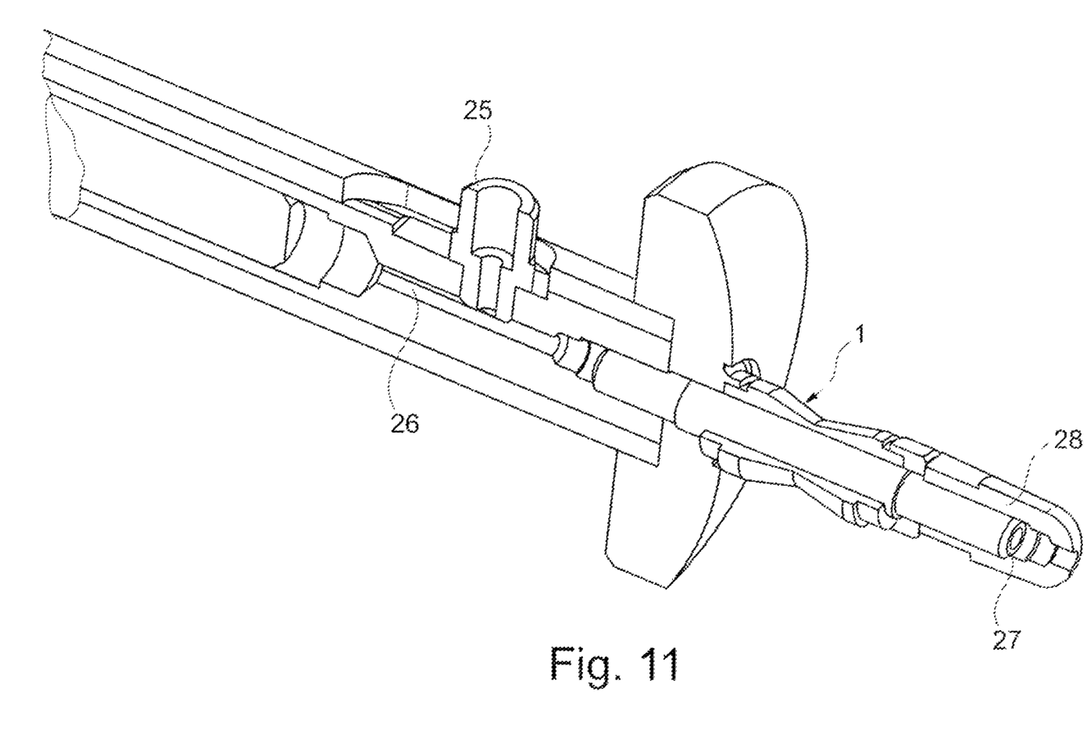
FIG. 11: shows an exemplary embodiment, by means of which clamping, sealing off and filling are possible.

FIG. 11 illustrates a variant of the device according to the invention which allows a combination of clamping, sealing off and filling in a single work cycle, all these functions being implementable simultaneously. The medium may in this case be either liquid or gaseous and be present in the form of overpressure or underpressure.

The flow of the medium passes via a connection fitting 25 into a circular slide element 26 and then through a tension bolt 27, designed as a hollow shaft, and through as guide element 28 which is drilled through.

Owing to the high radial force transmission which is possible by means of the device according to the invention, transportation of components during manufacture, without any damage, can be made possible. The clamping force can be set via the pressure sleeve 2, so that sensitive and powerful clamping is possible.

Figure 12:
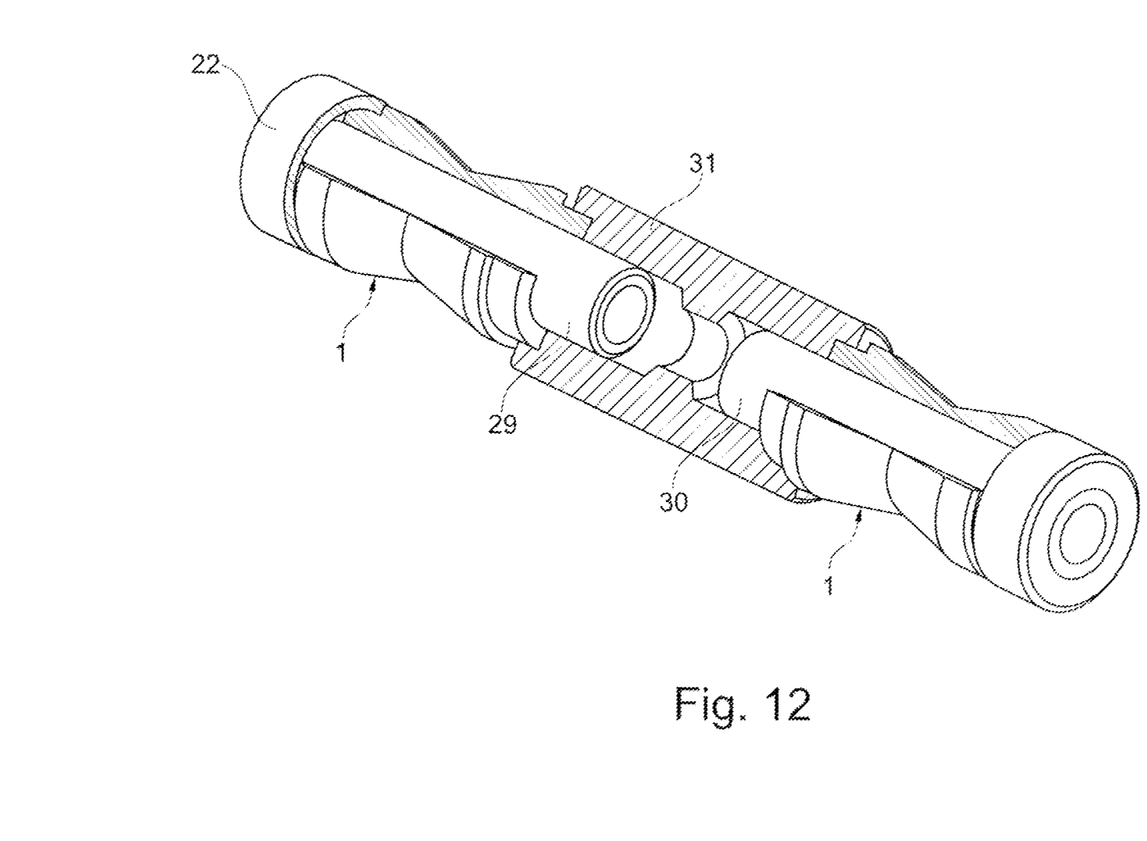
FIG. 12: shows an exemplary embodiment as a pipe connector.

A further field of use of the device according to the invention is the transition-free connection of two pipe ends, as illustrated in FIG. 12. To connect the two pipe ends, two concavely formed sealing bodies 1 are provided, to which a drilled-through tension bolt 29 and 30 is assigned in each case, one of the two tension bolts being provided with a left-handed thread and the other with a right-handed thread. The two tension bolts 29 and 30 are then held together means of a barrel nut 31.

Figure 13:
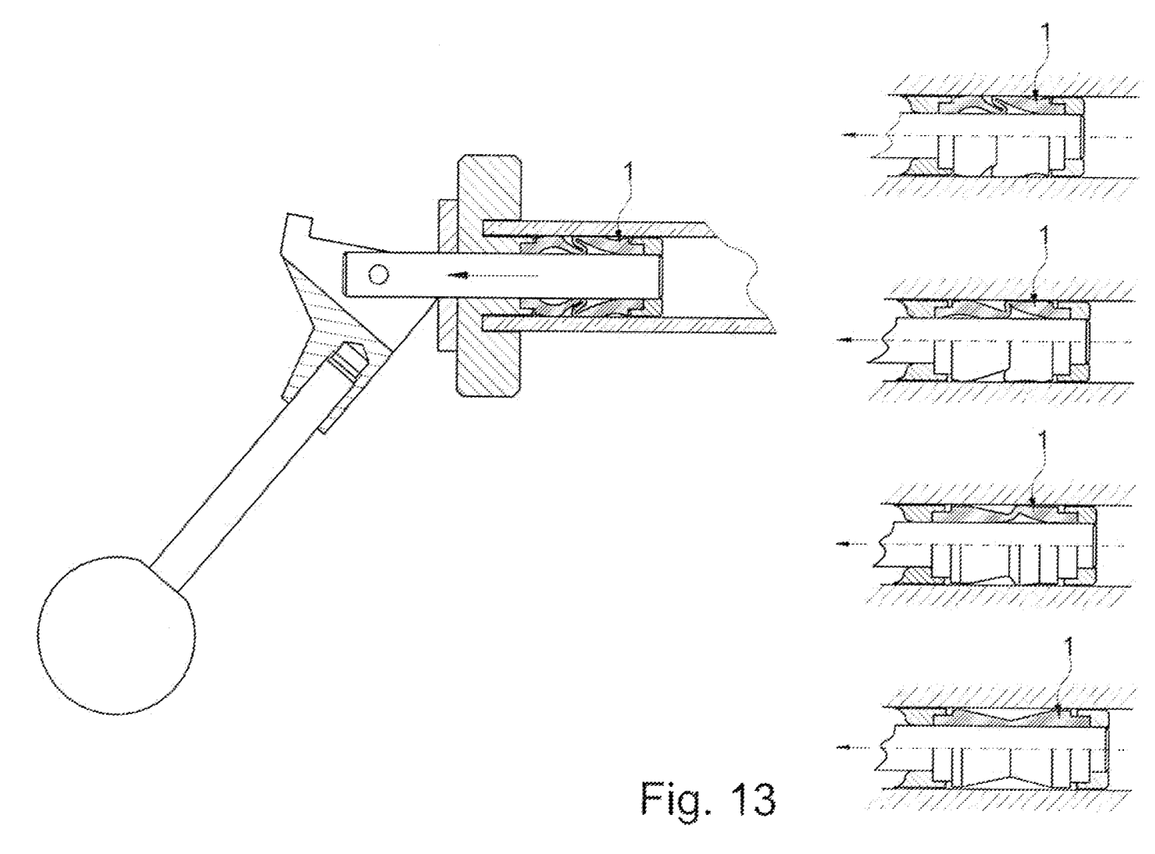
FIG. 13: shows a detailed illustration of the individual deformation steps of the sealing body.

The individual deformation steps of the sealing body 1 are illustrated in great detail in FIG. 13. In this case, in particular, it can be seen in detail how two lips or pressure zones are formed between the sealing body 1 and the bore of the component as a result of the deformation of the sealing body 1.

What is claimed:

1. A sealing device for cylindrical or conical orifices, comprising an elongate sealing body made of elastically deformable material, the following components being provided for the deformation of the sealing body:
    a tension bolt extending through a middle, free passage region of the sealing body,
    a pressure sleeve seated at an inner end of the tension bolt,
    a brace which is arranged at an outer end of the tension bolt and through which the tension bolt engages, and
    an actuation element, which acts upon the outer end of the tension bolt projecting through the brace, exerts a tensile force upon the tension bolt, wherein said tensile force deforms the sealing body and at the same time enlarges an outer circumference of the sealing body,
    wherein the sealing body is of concave form in length.

2. The sealing device as claimed in claim 1, wherein the sealing body is composed of elastomeric material with a Shore A hardness of above 75.

3. The sealing device as claimed in claim 1, wherein the concave sealing body has a narrowest point approximately in the middle, free passage region.

4. The sealing device as claimed in one of claim 1, wherein the sealing body includes a first frustoconical region and a second frustoconical region adjacent to the narrowest point.

5. The sealing device as claimed in claim 4, wherein an apex angle of the first frustoconical region is identical to or larger than that of the second frustoconical region.

6. The sealing device as claimed in claim 1, wherein a diameter of the pressure sleeve is adapted with slight undersize to the cross section of the cylindrical or conical orifice to be sealed off.

7. The sealing device as claimed in claim 1, wherein that region of the sealing body which is adjacent to the brace has a slightly smaller diameter than the orifice to be sealed off.

8. The sealing device as claimed in claim 1, wherein the sealing body has two ends including ring-cylindrical portions of reduced diameter that engage into corresponding reception regions of the pressure sleeve and of the brace.

9. The sealing device as claimed in claim 8, wherein in the expanded state of the sealing body, an air gap is provided in each case between outer end faces of the first frustoconical region and the second frustoconical region and outer bearing ends of the pressure sleeve and of the brace.

10. The sealing device as claimed in claim 9, wherein the actuation element is an eccentric which is connected pivotably to an outer end of the tension bolt and is equipped with a lever for pivoting the eccentric.

11. The device as claimed in claim 10, wherein a guide element is attached to the pressure sleeve to allow easy and quick introduction into a corresponding bore.

12. A method of conducting leak tests or filling operations, comprising:
   using the sealing device of claim 1 to grip a workpiece including a cylindrical or conical orifice.

13. A sealing device for cylindrical or conical orifices, comprising an elongate sealing body made of elastically deformable material, the following components being provided for the deformation of the sealing body:
   a tension bolt extending through a middle, free passage region of the sealing body,
   a pressure sleeve seated at an inner end of the tension bolt, wherein a diameter of the pressure sleeve is adapted with slight undersize to the cross section of the cylindrical or conical orifice to be sealed off,
   a brace which is arranged at an outer end of the tension bolt and through which the tension bolt engages, and
   an actuation element, which acts upon the outer end of the tension bolt projecting through the brace, exerts a tensile force upon the tension bolt, wherein said tensile force deforms the sealing body and at the same time enlarges an outer circumference of the sealing body,
   wherein the sealing body is of concave form in length, and
   wherein a region of the sealing body adjacent to the pressure sleeve has a slightly smaller diameter than the pressure sleeve.

14. A sealing device for cylindrical or conical orifices, comprising an elongate sealing body made of elastically deformable material, the following components being provided for the deformation of the sealing body:
   a tension bolt extending through a middle, free passage region of the sealing body, wherein the sealing body includes a first frustoconical region and a second frustoconical region adjacent to a narrowest point, and wherein the first frustoconical region and the second frustoconical region both have a cylindrical flat facing away from one another,
   a pressure sleeve seated at an inner end of the tension bolt,
   a brace which is arranged at an outer end of the tension bolt and through which the tension bolt engages, and
   an actuation element, which acts upon the outer end of the tension bolt projecting through the brace, exerts a tensile force upon the tension bolt, wherein said tensile force deforms the sealing body and at the same time enlarges an outer circumference of the sealing body,
   wherein the sealing body is of concave form in length.

\* \* \* \* \*